Oct. 21, 1930.        S. RUBEN        1,779,188
ELECTRIC CURRENT RECTIFIER
Filed March 11, 1925

Inventor
SAMUEL RUBEN
By his Attorney,

Patented Oct. 21, 1930

1,779,188

UNITED STATES PATENT OFFICE

SAMUEL RUBEN, OF NEW YORK, N. Y., ASSIGNOR, BY MESNE ASSIGNMENTS, TO RUBEN RECTIFIER CORPORATION OF DELAWARE

ELECTRIC-CURRENT RECTIFIER

Application filed March 11, 1925. Serial No. 14,657.

The invention relates to electric current rectifiers and the like, and particularly to the dry surface contact variety.

The object generally of the invention is to provide a device of the character indicated which is efficient, economical and readily manufactured.

More specifically, an object of the invention is to improve the character of the electrode elements which form the elemental asymmetric couples in devices of this character. Here this is particularly accomplished by employing zinc as the material for the the electro-positive electrode element, since this metal is relatively highly electro-positive in the electro-chemical series. Under such circumstances the cooperating electro-negative electrode is preferably composed of a material having current-blocking film-forming properties which is substantially non-oxidizable under ordinary service conditions, for example, silver sulphide.

Other objects of the invention will in part be obvious and will in part appear hereinafter.

The invention accordingly comprises the features of construction, combinations of elements and arrangement of parts which will be exemplified in the construction hereinafter set forth, and the scope of the application of which will be indicated in the claims.

This application is a continuation in part of certain of my prior applications, namely Serial No. 750,539, filed November 18, 1924, now Patent 1,649,742; Serial No. 754,956, filed December 10, 1924; and Serial No. 13,143, filed March 5, 1925, now Patent 1,649,744.

Figure 1:
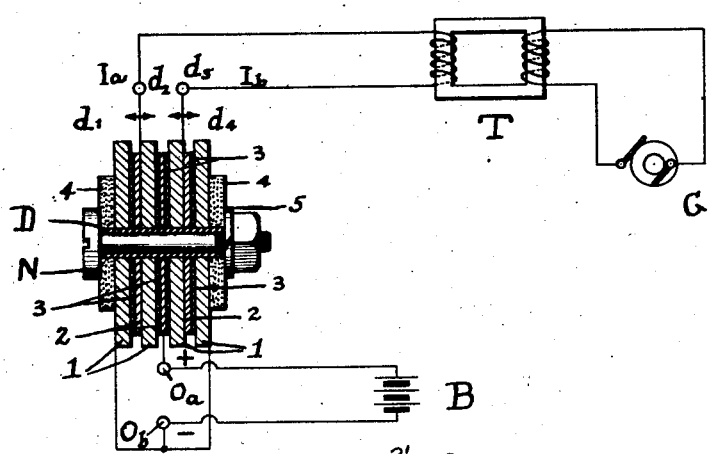
Figure 2:
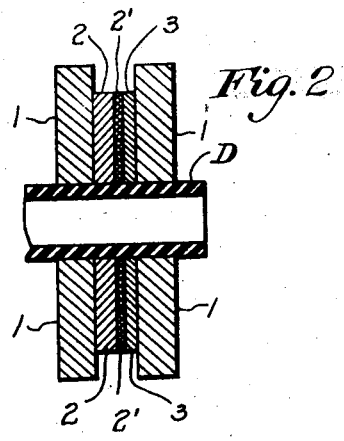

For a fuller understanding of the nature and objects of the invention reference should be had to the following detailed description taken in connection with the accompanying drawing, in which:

Fig. 1 is a view partly in section showing, mainly diagrammatically, a rectifying device arranged in accordance with the invention and adapted for battery charging; and Fig. 2 is a fragmentary sectional view showing details in the construction of a single asymmetric couple employed in the present invention.

In the practice of the present improvements an elemental asymmetric couple is provided for rectifying devices in which the electro-positive electrode element is of zinc; since this metal belongs to the second periodic group and is relatively strongly electro-positive. The cooperating electro-negative electrode element is composed of material which is a relatively electro-negative compound and is substantially non-oxidizable under ordinary service conditions, for example, silver sulphide. Rectification is effected by means of unilateral conductivity of a film which forms at the contacting junction of these two elements, i. e., between the contacting surfaces of the electro-positive and electro-negative elements. When such film is formed current flows through the couple when the zinc electrode element is negatively charged, and will not flow when that element functions as the anode in the circuit, the current-blocking film being due to the presence of sulphide which is formed on the surface of the zinc electrode produced by the reaction between the zinc and the sulphur compound. While any suitable method of securing close contact between the zinc electrode and the sulphide material can be adopted this intimate surface contact is preferably attained by applying the metallic sulphide material as a fine powder mixed with a chemically inert binder solution, such as gum arabic, the electrically non-conductive components thereof being burned out after application and sufficient heat being used also to coalesce the sulphide particles over the metal electrode surface. A body of reserve sulphiding material is preferably provided against the surface of the metallic sulphide electrode, which is of high sulphur content, for example cupric sulphide, such that if the zinc sulphide film is injured, it will readily give up sulphur upon the discharge of current, causing a repair or restoration of the injured zinc sulphide film which coats the same.

A current-consuming device, for example, a storage battery arranged to receive current from a rectifying device constructed in accordance with the invention cannot discharge through the rectifying device, in the event that the alternating current supply be interrupted or the voltage unduly lowered, since, when the potential of the current-consuming device becomes greater than that of the generator or charging source, the current-blocking properties of the rectifying device come into action to block the flow of inverse current and thereby automatically prevent the discharge of the current-consuming device.

Referring now to the drawing, G represents an alternating current generator, T a transformer in the circuit and B a battery being charged. A series of zinc plates, sulphide coated, is shown at 2 in surface contact with a thin layer of film-forming material, silver sulphide 2' (see Fig. 2), which is in surface contact with the sulphur carrying cupric sulphide plates 3. In contact with plates 3, are copper plates 1. For double wave rectification, the middle zinc plate 2, is coated on two sides with zinc sulphide, the zinc plates so coated on one side only and the other elements extending both ways from the electrode coated on two sides. Holding the various plates in contact under pressure is bolt N, insulated by tube D from the plates. At each end of bolt N is an insulating washer 4, and at one end is spring washer 5.

On $I_a$ and $I_b$ are the alternating current input leads and at $O_a$ and $O_b$ are terminals for the rectified current output. The positive pole of battery B is connected to the middle zinc electrode 2, the negative pole being connected to conductive plates 1. In operation, as the current is applied to the electrodes, it flows when the coated zinc plates are the cathodes, in a direction indicated by arrows $d_1$ and $d_4$; upon reversal of the polarity, the current flows as indicated by arrows $d_2$ and $d_3$, thus allowing complete rectification, and the application of direct current through output terminals $O_a$ and $O_b$. The battery receives a charge when the output direct current potential is greater than its own. Should this potential be reduced sufficiently the battery will not discharge in the opposite direction because of the practically open circuit resistance of the sulphide coated zinc electrode, when connected as the anode.

Having described my invention, what I claim as new and desire to secure by Letters Patent is:—

1. A current rectifier of the type described, having a pair of electrodes, one of which is zinc and the other of which is silver sulphide, said sulphide being in surface contact with a maximum valent compound of copper with sulphur.

2. A current rectifier of the type described, having a pair of electrodes, one of which is zinc and the other of which is silver sulphide, said sulphide being in surface contact with cupric sulphide.

3. In dry surface contact rectifying devices and the like, the combination, with an electro-positive electrode element comprising metallic zinc, of an electro-negative electrode element comprising silver sulphide disposed for relatively constant asymmetric conduction in contact with the first said electrode element.

4. In dry surface contact rectifying devices and the like, the combination, with an electro-positive electrode element comprising metallic zinc, of an electro-negative electrode element comprising silver sulphide, and a reserve body of a sulphur-supplying compound in contact with said silver sulphide electrode element.

In testimony whereof, SAMUEL RUBEN has signed his name to this specification this 4th day of March, 1925.

SAMUEL RUBEN.